(12) United States Patent
Gulati et al.

(10) Patent No.: US 7,912,951 B2
(45) Date of Patent: *Mar. 22, 2011

(54) QUALITY OF SERVICE MANAGEMENT

(75) Inventors: Ajay Gulati, Mountain View, CA (US); Irfan Ahmad, Mountain View, CA (US); Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/260,054

(22) Filed: Oct. 28, 2008

(65) Prior Publication Data
US 2010/0106820 A1    Apr. 29, 2010

(51) Int. Cl.
*G06F 15/173* (2006.01)
*G06F 13/28* (2006.01)
*G06F 9/46* (2006.01)

(52) U.S. Cl. ........ 709/224; 709/223; 709/225; 709/226; 711/167; 711/168; 711/151; 711/158; 718/100; 718/102; 718/103

(58) Field of Classification Search .......... 709/223–226; 718/100–103; 711/167, 168, 151, 158
See application file for complete search history.

(56) References Cited

U.S. PATENT DOCUMENTS

| | | | | |
|---|---|---|---|---|
| 5,758,149 | A * | 5/1998 | Bierma et al. | 1/1 |
| 6,157,963 | A * | 12/2000 | Courtright et al. | 710/5 |
| 6,880,017 | B1 * | 4/2005 | Marce et al. | 709/232 |
| 7,047,312 | B1 * | 5/2006 | Aweya et al. | 709/235 |
| 7,305,537 | B1 * | 12/2007 | Moore et al. | 711/167 |
| 2002/0053038 | A1 * | 5/2002 | Buyuktosunoglu et al. | 713/320 |
| 2002/0188648 | A1 * | 12/2002 | Aweya et al. | 709/102 |
| 2004/0064577 | A1 * | 4/2004 | Dahlin et al. | 709/235 |
| 2005/0021879 | A1 * | 1/2005 | Douglas | 710/5 |
| 2007/0280111 | A1 * | 12/2007 | Lund | 370/235 |
| 2008/0244209 | A1 * | 10/2008 | Seelam et al. | 711/168 |
| 2010/0030931 | A1 * | 2/2010 | Balasubramanian | 710/39 |
| 2010/0195494 | A1 * | 8/2010 | Sun et al. | 370/230 |

* cited by examiner

*Primary Examiner* — Joseph E Avellino
*Assistant Examiner* — Aftab Nasir Khan
(74) *Attorney, Agent, or Firm* — Leonard E Heyman

(57) ABSTRACT

A method and system for providing quality of service to a plurality of hosts accessing a common resource is described. According to one embodiment, a plurality of IO requests is received from clients executing as software entities on one of the hosts. An IO request queue for each client is separately managed, and an issue queue is populated based on contents of the IO request queues. When a host issue queue is not full, a new IO request is entered into the host issue queue and is issued to the common resource. A current average latency observed at the host is calculated, and an adjusted window size is calculated at least in part based on the current average latency. The window size of the issue queue is adjusted according to the calculated window size.

42 Claims, 7 Drawing Sheets

QUALITY OF SERVICE MANAGEMENT

BACKGROUND

Modern data centers often have a multi-tier configuration wherein a front end server accesses one or more layers of middle-tier and back-tier servers for various services. One example of a back-end server is a storage array. Storage arrays form the backbone of modern data centers by providing consolidated data access to multiple applications simultaneously. Increasingly, organizations are moving towards consolidated storage, either using block-based access over a Storage Area Network (SAN) or file-based access over Network-Attached Storage (NAS) systems. A Storage Area Network is a network whose primary purpose is the transfer of data between computer systems and storage elements. Easy access from anywhere at anytime, ease of backup, flexibility in allocation and centralized administration are some of the advantages of storage arrays.

Quality of Service (QoS) refers to resource management methodologies whereby resources are allocated among a plurality of users or clients according to a policy. The policy may guarantee a minimum and/or maximum level of service (e.g., as a percentage of resources). It is also common to distribute services according to an assigned resource "shares," which are alternatively referred to in literature as "weights," so that each client is provided a level of service that compares to its peers at the same ratio as the assigned shares. In addition, combinations of these policies are possible. Thus, QoS suggests an ability to evenly distribute services or arbitrarily assign priority to selected applications, users, or data flows.

In the field of computer networking, QoS has been implemented to provide a guaranteed minimum bit rate, delay, jitter, packet dropping probability, or error rate. For example, in the case of TCP based QoS, a host may try to control dataflow based on round trip time (RTT) and packet loss probability. In TCP, the RTT is the elapsed time from the transmission of a packet to receipt of an acknowledgement by the recipient. The RTT effectively measures the delay imposed by the intervening, generally stateless, network. Packet loss probability is the percentage of packets for which acknowledgements were not received within a given period of time. Packets may be lost at any point along the transmission path from the host to the recipient, due to any number of factors such as oversaturation of network switches, corrupted packets rejected in-transit, etc.

Because there are significant differences between TCP and middle tier/back end servers, the techniques known for providing QoS management of TCP data flows over a network are not directly applicable to middle tier and back end servers. For some back-end servers, it is simple to provide a centralized QoS management mechanism at the server itself, to guarantee each client its assigned share of resources. However in some types of servers, such as in appliances such as storage arrays, the servers appear as black boxes to the clients and are therefore not easily (or at all) configurable for QoS.

With regard to storage array management, most existing solutions provide bandwidth allocation among multiple applications running on a single host. In that case, one centralized scheduler has complete control over requests going to the storage systems. Other approaches try to control the queue length at the array to provide tight latency control, but they are also centralized. In a distributed case, throttling based approaches such as Hewlett-Packard's "Triage" system for storage QoS have been proposed. Such host-based throttling solutions use centralized monitoring and work at a very coarse granularity which may cause substantial loss in utilization. Running them at finer granularity may cause a prohibitive increase in communication costs. In general, strict throttling solutions lead to efficiency losses and non work-conserving behavior.

SUMMARY

It should be appreciated that the present invention can be implemented in numerous ways, including as a process, an apparatus, a system, a device, a method, or a computer-readable medium.

In one embodiment, a method and system for providing quality of service to a plurality of hosts accessing a common resource is provided. A plurality of IO requests is received from clients executing as software entities on one of the hosts. An IO request queue for each client is separately managed, and an issue queue is populated based on contents of the IO request queues. When a host issue queue is not full, a new IO request is entered into the host issue queue and is issued to the common resource. A current average latency observed at the host is calculated, and an adjusted window size is calculated at least in part based on the current average latency. The window size of the issue queue is adjusted according to the calculated window size.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
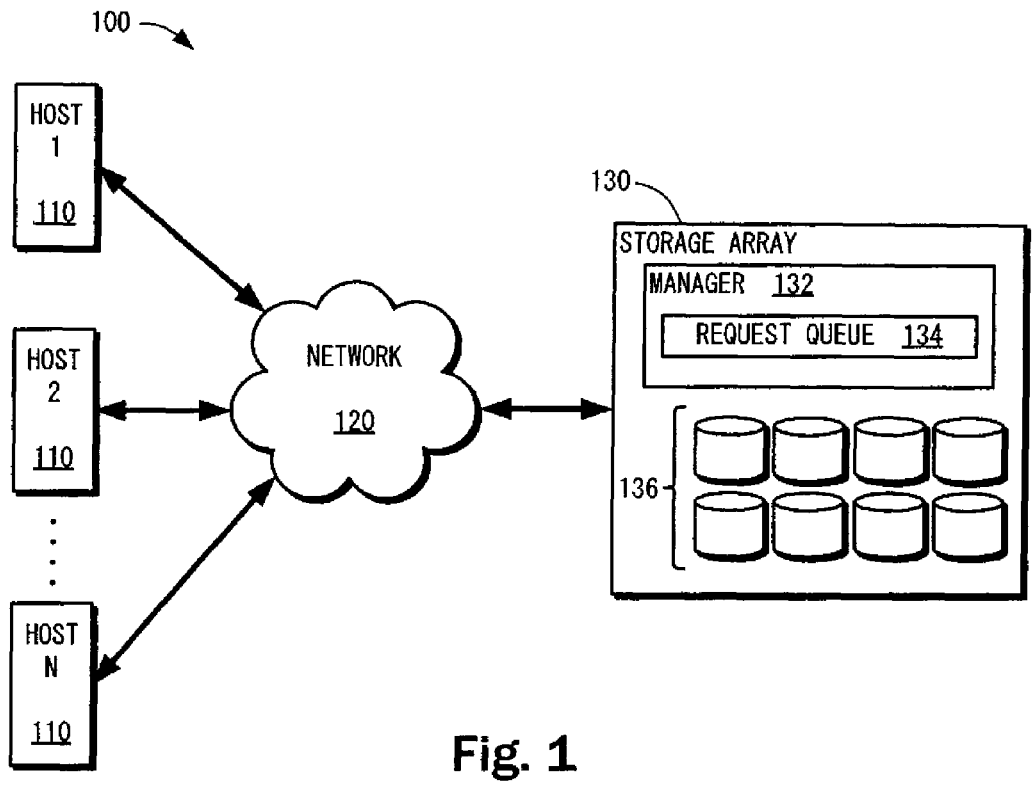
FIG. 1 shows a block diagram that shows by way of example a system having a plurality of hosts connected through interconnect network to a storage array.

FIG. 1 is a block diagram that shows by way of example a system 100 having a plurality of hosts 110 connected through interconnect network 120 to a shared resource such as storage array 130. There may be any number n of hosts 110, each of which may comprise a general purpose computer system having one or more applications, virtual machines, or other entities, accessing data stored on storage array 130. Interconnect network 120 may be a wide area network a local area network, or a network hosting a protocol especially suited for storage arrays, such as Fibre Channel, iSCSI, HyperSCSI, etc. For example network 120 may comprise one or more of Fibre Channel switches. Storage array 130 may be any type of storage array such as a network-attached storage (NAS) Filer or a blocked-based device over a storage area network (SAN). The storage array may include a manager 132 and an array of devices 136 (e.g., disks). Manager 132 is a computer program executing on one or more computer systems, which may be implemented as an appliance or a plurality of appliances working in tandem. Manager 132, may, for example, comprise a plurality of storage processors, as generally understood in the art of storage arrays. While storage arrays are typically made up of a plurality of disks, it should be recognized that as prices for solid-state non-volatile storage devices fall, they are increasingly taking the place of rotating disk storage media. The use of the term, "disk" herein, should therefore not be construed as limited only to rotating disk storage media, but also what is become known as solid state disks, or "SSDs."

Manager 132 maintains a request queue 134, which is a list of pending IO requests that may be satisfied in any order. Each request comprises a request to read and/or write data to or from storage array 130. Each read request identifies an address, address range or other identifier of the data to be read whereas write requests include data to be written along with an identifier for a location in the array where the data is to be written. Each request that is pending in request queue 134 corresponds to a request from one of hosts 110.

Figure 2:
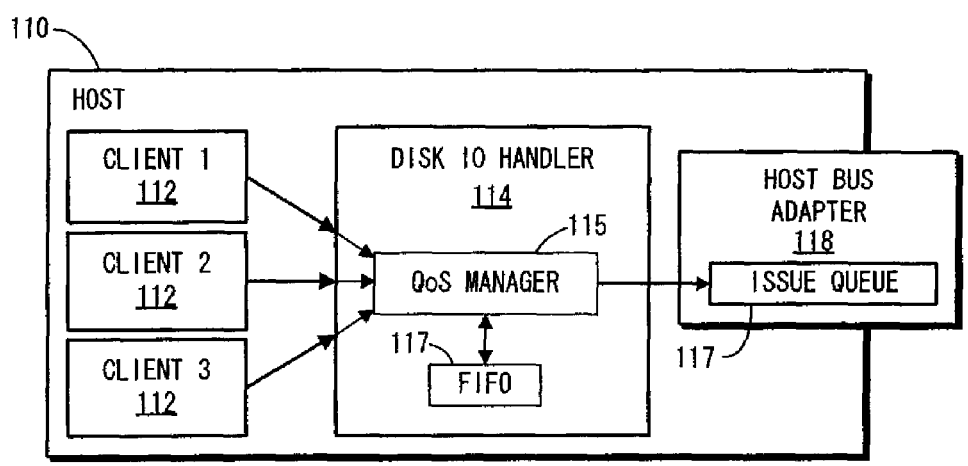
FIG. 2 shows an exemplary host.

FIG. 2 shows an exemplary host 110. Host 110 includes a plurality of clients 112, a disk handler 114, and a host bus adapter (HBA) 118. As used herein, the term, "client" is intended to be broadly interpreted as a software entity such as a process, a user login, an application, a virtual machine, a collection of any of the above, etc. In an exemplary non-virtualized system, each client 112 may be an application running on a host operating system (not shown) which includes disk IO handler 114. Disk IO handler 114 may be an integrated component of the host operating system, i.e., the OS kernel, or it may be a driver or other external component. In either case, each client 112 may issue IO requests (read or write) to disk IO handler which implements a quality of service (QoS) manager 115. QoS manager 115 receives each request and, in accordance with a control algorithm such as that described below, immediately or eventually passes the request to issue queue 117 of host bus adapter 118 and to storage array 130 (FIG. 1). Although generally implemented in hardware as shown in FIG. 2, it is also possible for all or part of issue queue 117 to be implemented in software, e.g., as described in detail below. Issue queue 117 reflects a list of IO requests pending at storage array 130 (FIG. 1). The term "queue" should not be narrowly construed as a first-in, first out (FIFO) buffer, but simply a list of pending requests that may be satisfied in any order by storage array 130. In one embodiment, issue queue 117 comprises a set of elements that maintain dispatch and completion information about requests from clients 112 outstanding at the storage array 130.

Figure 3:
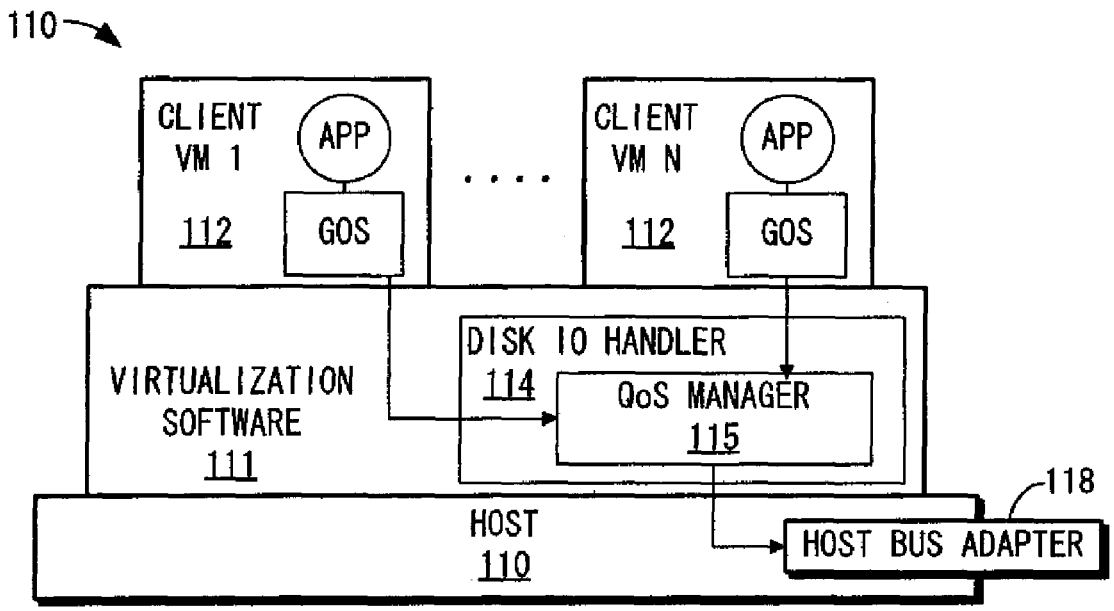
FIG. 3 shows a host comprising a virtualized computer system.

FIG. 3 shows one embodiment of host 110 that comprises a virtualized computer system wherein each client 112 is a virtual machine (VM) and disk IO handler 114 is implemented by virtualization software 111, or a component thereof or attached thereto. Virtualization software 111 may be implemented as one or more layers of software logically interposed between and interfacing with clients 112 as physical hardware of host 110. In one embodiment, virtualization software 111 comprises a virtualization kernel (not shown) for managing physical resources and a virtual machine monitor (VMM) (not shown) for each client 112 for emulating virtual hardware and devices with which software within client 112 interacts. In another embodiment, virtualization software includes a host operating system (not shown) for managing physical resources. These and other virtualization configurations are well known in the field of computer virtualization. Any number N of clients 112 may execute concurrently on host 110 using virtualization software 111, the number N being limited only by physical resources such as memory and processing bandwidth.

Each VM may include a guest operating system (GOS) and one or more applications (APP). The guest operating systems may be a commodity operating system such as Microsoft Windows® or a specialized operating system designed specifically to work with virtualization software 111 (sometimes referred to as a "paravirtualized OS"). In one embodiment, virtualization software 111 resides on a physical data storage medium (not shown) forming part of host 110, whereas virtual disks (not shown) for each client virtual machine are mapped by virtualization software 111 to files that reside remotely or locally. The guest operating system and applications access data at storage array 130 by way of a virtual host bus adapter (not shown) that is mapped by virtualization software 111 to host bus adapter 118. Note that this need not be a one-to-one mapping; e.g., there could be several virtual disk controllers in the guest and multiple physical HBAs on the host. In this case, the virtualization software may choose to send individual requests via different physical HBAs.

If one or more of hosts 110 have one or more VMs running, it may be desirable to assign a QoS share for each VM. For example, one host 110 may have two VMs, wherein one of the VMs requires faster response time. In this case, it would be desirable to provide greater QoS shares to the VM requiring the faster response time. A similar situation can occur for non-VM clients as well, wherein an operating system can give greater shares to one running application in preference to other running applications. Using the QoS algorithm as described herein, it is possible, in some embodiments described below, to separately assign shares to individual clients.

Referring back to FIG. 1, from the perspective of each host 110, storage array 130 represents a "black box" that stores and retrieves data. Although the present description refers particularly to storage array 130, it should be recognized that the principles described herein may be applied to any shared resource such as middle or back-tier server and is particularly useful for stateful appliances such as storage systems. In system 100, each host 110 may be accessing the same or different devices 136 on the array. Therefore, if two or more hosts have requests pending for the same device, contention and increased latency can result. Each host may act autonomously and can therefore impact all the other hosts. For example, if one host has 128 requests pending at the array, then all the other hosts accessing the array will see a reduction in performance as a result of the 128 pending requests. This unfairly allows one host to potentially monopolize the array, conflicting with QoS policies. In general, there can be any number of hosts 110 accessing one or more logical disk volumes (typically referred to using the acronym "LUNs" for "logical unit numbers") each of which may be distributed across multiple physical devices. In typical configurations, the number of hosts 110 on a storage array may vary from 4 to 32.

In stark contrast to most physical networks such as the Internet or network 120, storage array 130 is stateful and so its throughput can be quite variable. Contention at the array, e.g., at the array controller, cache, buses, and disk arms, may lead to unpredictable IO completion times. These features of storage array 130 complicate the possibility of fair distribution of services among hosts 110.

For instance, it is known that latency of a request to read or write data at a particular target location can vary from a fraction of a millisecond to tens of milliseconds depending on target locations of the previous request. Average seek delays for current disks range from 6 ms to 15 ms, which can cause an order of magnitude difference in service times. This makes it very difficult to estimate a baseline IO latency corresponding to the latency with no queuing delay. A sudden change in average latency or ratio of current values to previous average values may or may not be a signal for overload, as would generally be the case in a stateless system such as a network.

In addition, write IO requests are often completed to the host once the block is written in the array controller's non-volatile random access memory (NVRAM), which can occur orders of magnitude faster than the physical writing process. Writes are periodically flushed from the NVRAM to the disk during the "destage" process. However, unless data requested in a read IO request is already present in the controller's cache, read IO requests may need to access the disk prior to satisfying the request. Two read IO requests from a single stream may have widely varying latencies if one of the requests hits in the cache and the other request misses. In certain RAID ("redundant array of individual (or inexpensive) disks") systems, writes may take four times longer than reads due to parity read and update. In general, the IO requests from a single stream may have widely varying response times, thereby affecting the latency estimate.

Furthermore, in the case of storage, the range of sizes of a particular request may impact latency in obvious ways. A single IO request may be for reading or writing as little as 512 bytes or, for certain recent devices, as much as one megabyte (1 MB).

The above unique features of storage arrays make using latency to measure QoS highly problematic. In particular, a mechanism is needed for estimating highly variable latency and using latency as a predictor. The mechanism should distinguish between latency changes caused by the workload from that caused by overload at the array. Experiments have further shown that beyond a certain queue depth, the average latency continues to increase with out any significant improvement in terms of overall throughput. Thus it is desirable to keep a certain number of IOs pending so as to obtain high throughput while keeping low queuing delays. To overcome these difficulties, an exemplary control algorithm is described herein that manages issue queue size based in part on a calculation of a moving average latency, referred to herein as "current average latency" or CAL.

In one embodiment, the current latency L is the issue queue residency time for the IO request most recently removed from issue queue 117 (FIG. 2). An IO request is added to issue queue 117 when the IO request is issued to storage array 130 and removed from issue queue when an acknowledgement of fulfillment of the request is received by host 110. In an alternate embodiment, the latency is calculated on a fixed IO size basis, to at least partially compensate for varying completion times for requests with very different sizes. For example, a per 4 KB latency may be calculated as Fixed Cost+(L−Fixed Cost)*IO Size/4, where L is the latency as described above and the IO size is in kilobytes.

The current average latency (CAL), on the other hand, in one embodiment, is calculated using a well-known Exponentially Weighted Moving Average (EWMA). The degree of weighing past values is determined by a constant smoothing parameter α, which is a number between zero and one. For example if L is the current latency value, then the formula for CAL at time t may be as provided in Equation 1:

$$CAL_T = (1-\alpha) \times L + \alpha \times CAL_{t-1} \quad \text{(Eq. 1)}$$

The value t for "time" may be construed literally such that CAL is periodically calculated in response to a clock signal, but in one embodiment, time t refers to request count, so that CAL is calculated every time, or every X times, a request is satisfied and removed from issue queue 117. As can be seen by Equation 1, α values closer to one will result in less oscillation but slower reaction time. In certain embodiments, for example, α is set very close to one, e.g., 0.99, thereby effectively taking an average over a few hundred IO requests.

Figure 4:
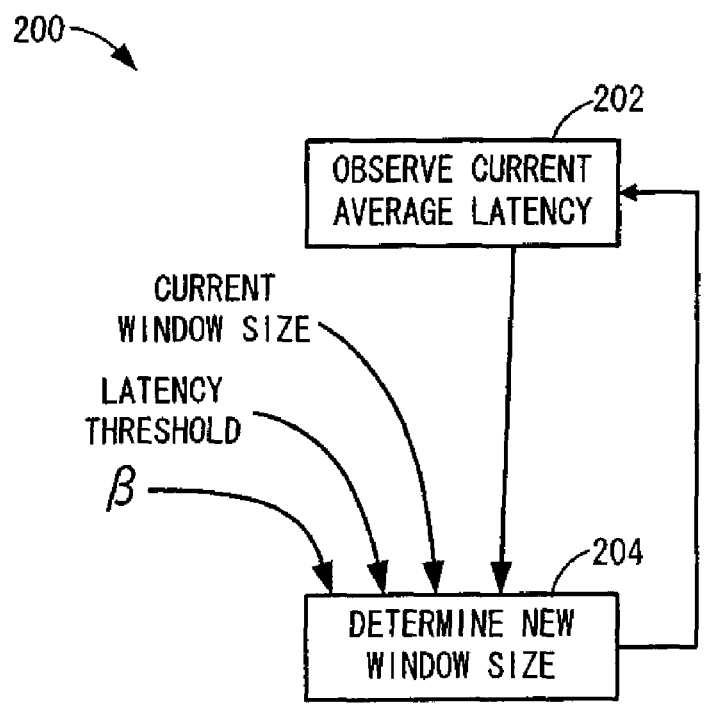
FIG. 4 shows flowchart, illustrating by way of example a procedure for adjusting window size based on current average latency.

In one embodiment, the size of the issue queue, also referred to as "window size" or just "window" may be varied according to a control algorithm. The control algorithm may use an additive increase/multiplicative decrease (AIMD) policy or a similar policy. FIG. 4 shows flowchart 200, illustrating by way of example a procedure for adjusting window size based on current average latency. In operation 202, the current average latency (CAL) is observed as described above. The procedure then flows to operation 204, wherein a new window size is determined as an adjustment to the current window size based on a comparison of CAL and $LAT_{threshold}$, which is a fixed constant that is the same for all hosts 110 in system 100 (FIG. 1). To provide arbitrary shares to each host, a value β may, in various embodiments, be factored into the new window size. The value β may be unique to each host 110, and in one embodiment, is a value proportional to the assigned shares for that host. After the new window size is set in operation 204, the procedure returns to operation 202 to observe a new current average latency, and the cycle repeats.

In one embodiment, the new window size is determined using a window estimation formula. In one embodiment, the window estimation formula is as shown by Equation 2:

$$w(t+1) = (1-\gamma)w(t) + \gamma\left(\frac{LAT_{threshold}}{CAL(t)}w(t) + \beta\right) \quad \text{(Eq. 2)}$$

Equation 2 solves for a new window size w(t+1), wherein w(t) denotes the current (at time t) window size, γ is a number between zero and one, $LAT_{threshold}$ is the latency threshold, and β is a per-host parameter. Whenever CAL increases above $LAT_{threshold}$, the window size is decreased. When the overload subsides, and the CAL becomes smaller than $LAT_{threshold}$, window size will be increased based on a current estimate and β.

The constant γ is a value selected between zero and one and defines how much influence the current window size has over the new window size. The lower the value of gamma, the more weight is given to the current window size w(t). In various embodiments, γ is set to be a relatively low value such as 0.2. Because β is used directly in the equation to compute window size, the β value for each host is usually set to a value greater than zero and less than about four such that all β values have a common proportion P to the corresponding assigned share for the corresponding host. Thus, for each host, $\beta_{hostX}=P*Share_{hostX}$, wherein P is selected so that all β values are within a particular range, i.e., below a small constant, such as 4, and the assigned share is a value that may be arbitrarily assigned by an administrator to assign proportional access to the storage array. Theoretically, the equilibrium value of window size resulting from Equation 2 for each host will be proportional to the corresponding β value.

For example, referring back to FIG. 1, if system 100 has four hosts 110, including three normal hosts that do not require very fast disk access, and one critical host that requires fast disk access, the administrator could assign 1000 proportional shares to each of the normal hosts and 12,000 proportional shares to the critical host, for a total of 15,000 shares. A simple algorithm can be used to reduce these numbers to values between zero and four while maintaining their proportionality. For example, each normal host may be assigned a β value of 0.3 whereas the critical host be assigned a β value of 3.6. For a steady state at or near a selected threshold value of 300 milliseconds, assume the total requests pending at the storage array is 150. In this case, on average, each normal host will have IO requests pending and the critical array will have about 120 requests pending. Thus, storage array 130 can issue about 12 times the number of requests for the critical host in a given amount of time than any of the normal hosts.

In one embodiment, to avoid extreme behavior from the control algorithm, w(t) may be limited by an upper bound $w_{max}$. This avoids very long queues at the array by bounding the latency faced by newly activated hosts. Thus, in this embodiment, the system relies on three main parameters: an upper bound $w_{max}$, the system-wide $LAT_{threshold}$, and the per-host value β. The upper bound can be set independently for each host 110 or can be system wide. In typical configurations, $w_{max}$ may be based on typical values that are used for queue length (32 or 64) and the array configuration such as the number of hosts accessing a volume, number of physical disks in the volume, etc. In addition, a lower bound on the window size may be implemented in order to avoid starvation. In one embodiment for example, a lower bound of four is imposed on the window size.

Latency threshold, $LAT_{threshold}$, may be set empirically based on the relationship between latency and throughput. The algorithm described herein will tend toward a latency close to $LAT_{threshold}$. Furthermore, the overall number of pending IO requests (i.e., the sum of all issue queue depths) will be proportional to the product of $LAT_{threshold} \times capacity$, wherein the capacity is the number of IO requests that can be processed by storage array 130 in a given amount of time. Therefore, so long as capacity does not reduce too much (e.g., as a result of an increase in the number of reads verses writes, increased amount of data requested to be read or written by each request, or reduced sequentiality of data causing an increase in seek time) there should be sufficient number of pending IO requests at the storage array 130. A typical conservative value for $LAT_{threshold}$ would be between 30 and 50 milliseconds. In one embodiment, $LAT_{threshold}$ is a user-adjustable parameter with a broad range, e.g., 15-200 milliseconds. User input could therefore be used to set the threshold based on application-specific requirements. In addition to QoS fairness, efficient utilization of the storage array and a work-conserving algorithm are important goals. In another embodiment, $LAT_{threshold}$ can also be adjusted by observing the long-term behavior of the workload. This observation may be performed by a central entity (e.g., a manager such as that described below with reference to FIG. 5) that can obtain latency and bandwidth information from all hosts and observe the latency values that correspond to various peaks in the observed bandwidth.

Referring again to FIGS. 1 and 2, it should be noted that the algorithm described above executes independently in each host 110. The algorithm provides a robust QoS solution without requiring any inter-host communication or coordination, nor any special information from storage array 130. In certain embodiments though, the average latencies of individual clients or hosts are combined to provide a more stable result.

Figure 5A:
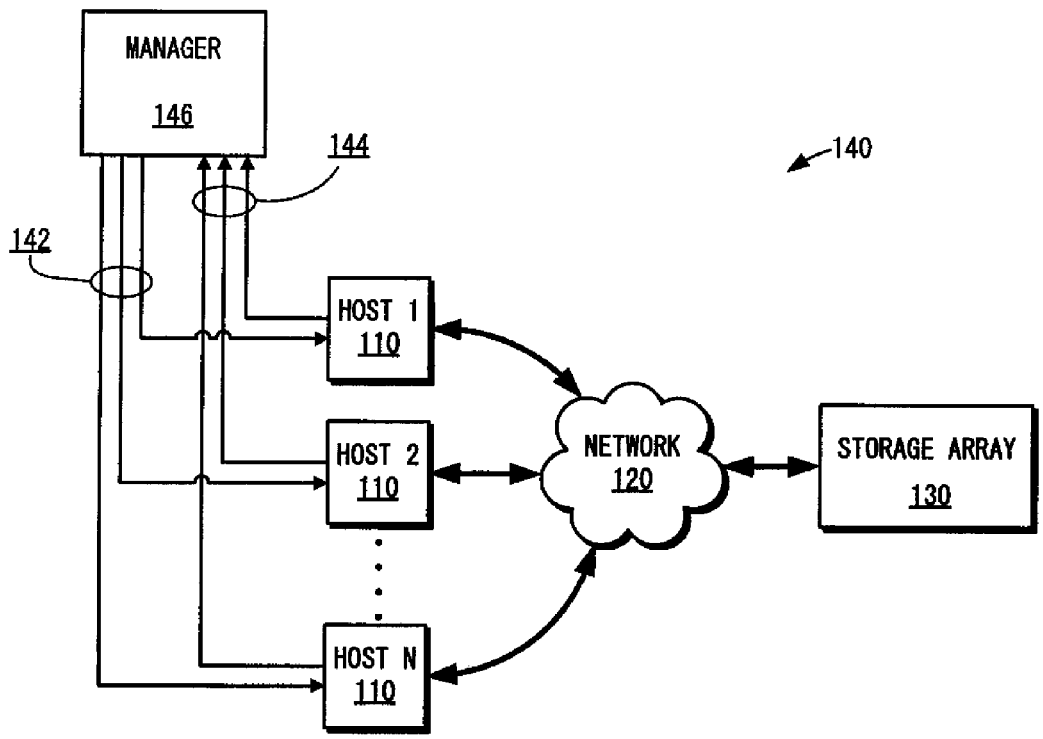
FIGS. 5A and 5B illustrate methods for combining latency values from multiple hosts.

In the embodiment shown in FIG. 5A, manager 146 is in communication with each host 110. In one embodiment, manager 146 is a computer program that resides and executes in a central server (not shown). In another embodiment, manager 146 executes in one of hosts 110. For example, manager 146 may be implemented in each host 110, wherein one of hosts 110 is selected by an administrator or by using an automated selection protocol to become a "master" host, and therefore executes manager 146. The selection protocol could be, for example, based on unique host identifiers such as the media access control (MAC) addresses of each host, wherein the host having the largest derived value (e.g., directly or using a hash) from the identifiers of all hosts 110 becomes "master" and performs the functions of manager 146.

In one exemplary embodiment having centralized control, each host 110 sends current latency or current average latency values 144 to manager 146. The latency values may be based on latencies seen by individual clients executing on hosts 110 (as described below with reference to FIGS. 7, 8A-8C), or the latencies seen by the host itself. Manager 146 then combines the latency values to find a combined average latency. The combination may be an average of the latency values or an approximation, e.g., by a statistical sampling. Manager 146 then sends, e.g., by broadcasting, the combined average latency to each host 110, which then locally computes appropriate window sizes, using Equations 1 and 2 above, appropriate window sizes for each host based on the combine average latency.

Other mechanisms for combining latency values are contemplated. For example, in one embodiment, each host 110 uses a user datagram protocol (UDP) socket to listen for statistics advertised by other hosts. The statistics include the average latency and the number of IOs per LUN. Each host either broadcasts its data on a common subnet, or sends it to every other host individually. This is an instance of the general problem of average- and sum-aggregation for which efficient distributed solutions exist, as exemplified in the article, "Scalable management and data mining using astrolabe by R. V. Renesse and K. Birman, from the International Workshop on Peer-to-Peer Systems (IPTPS), 2002.

Figure 5B:
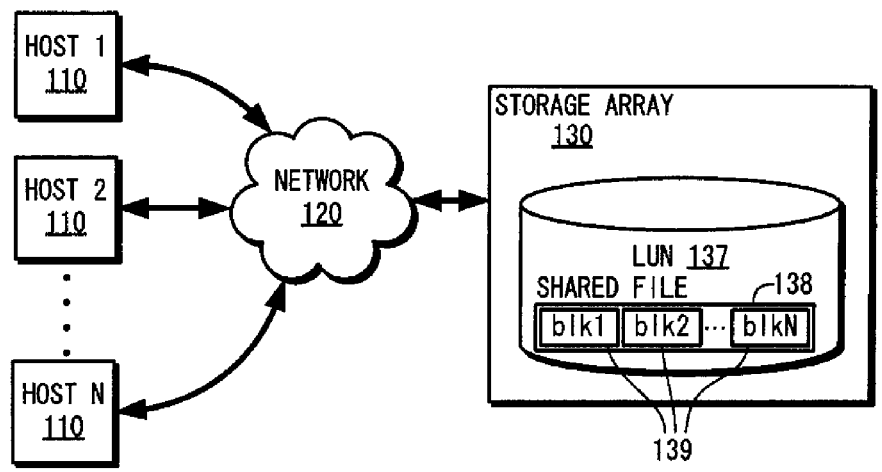

FIG. 5B shows another embodiment particular to controlling access to shared file system volume (LUN) 137, the same medium is used to share the latency statistics among the hosts. In this embodiment, shared file 138 is implemented for each volume and is accessed by multiple hosts and/or clients simultaneously. Each host 110 owns a single corresponding disk block 139 occupied by shared file 138 and periodically writes its average latency and number of IOs for the LUN into that block. The latency value written may be the current average latency viewed by the host, or individual current average latencies viewed by the clients executing on the host (as described below with reference to FIGS. 7, 8A-8C), or some combination, e.g., a weighted average of client latencies, wherein clients having larger IOs, more IOs, larger shares, and/or larger window sizes are weighted differently. Other hosts 110 read the file periodically using a single large IO and independently compute cluster-wide, or a combined average latency value to use for inputting into the window size estimation formula. Various modifications of this approach may be devised. For example, for LUNs shared by a large number of clients or hosts, smaller IOs sampling a subset of the blocks making up the shared file may be read, and the combined average latency may be calculated based on the subset.

Figure 6:
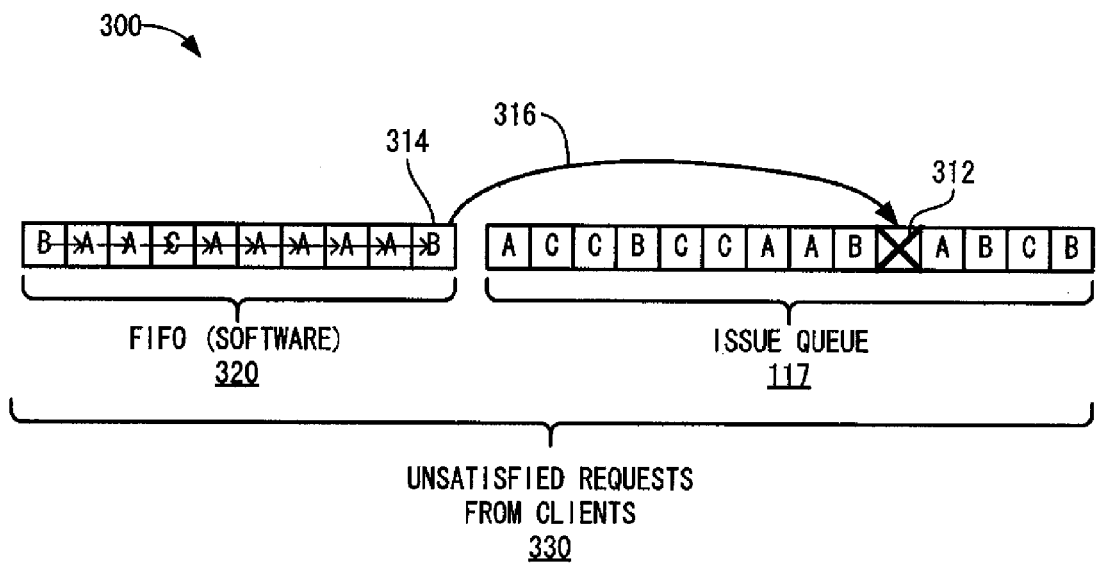
FIG. 6 shows a diagram illustrating an exemplary technique for managing an issue queue where more requests are received from clients than the issue queue can accommodate.

FIG. 6 shows a diagram 300 illustrating an exemplary technique for managing an issue queue where more requests 330 are received from clients 110 (FIG. 1) than the issue queue 310 can accommodate. As mentioned above with reference to FIG. 2, in many instances, issue queue 117 is implemented in hardware as part of the HBA for each host. In these cases, issue queue 117 may have a maximum size that can be exceeded by the total number of requests from clients 112. To accommodate these "overflow" IO requests, buffer 320 receives overflow IO requests from all clients when issue queue 117 is full. In one embodiment, buffer 320 is a first-in, first out (FIFO) buffer. When an IO request is satisfied, a slot 312 in the issue queue is opened, as represented by an "X" in FIG. 6. At this time, the next (longest-residing) IO request 314 in buffer 320 is sent HBA 118, which forwards the IO request to the storage array holds information about the IO request in issue queue 117 as indicated by arrow 316. This technique has the disadvantage that, if one client issues a large number of IO requests, subsequent requests from other clients on the same host will be delayed by having to wait behind the other IO requests in buffer 320. For example, FIG. 6 shows buffer 320 mostly filled with IO requests from client "A" When new IO request 318 is received from client "B," it is forced to wait until all pending "A" IO requests are passed to the issue queue. Although in this embodiment buffer 320 is a FIFO buffer in which the longest-residing IO request is removed, other algorithms may be implemented, such as preferentially selecting IOs in series that are close to one other.

Figure 7:
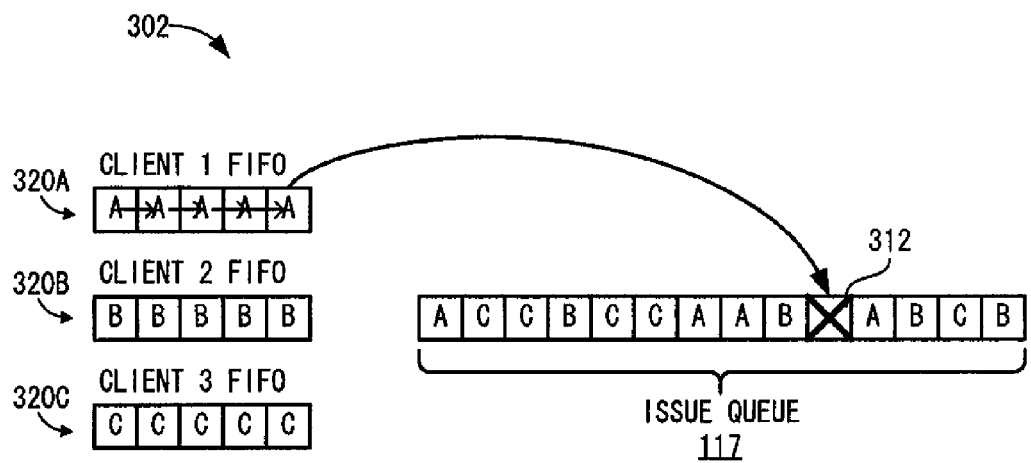
FIG. 7 shows a diagram that illustrates another technique for managing an issue queue wherein a separate buffer is provided for each client.

FIG. 7 shows a diagram 302 that illustrates another embodiment wherein a separate buffer 320A, 320B, 320C is provided for each client. When IO request 312 is satisfied, a new IO request takes its places in issue queue 117 from one of buffers 320A, 320B, or 320C. User-set shares for each client on the host can be implemented by changing the frequency of IO request draw from the corresponding client. For example, if clients, 1, 2, and 3 are given shares of 100, 200, and 300, respectively, then for every one IO request pulled from buffer 320A, two IO requests are pulled from buffer 320B and three IO requests are pulled from buffer 320C. It should be noted that some HBAs may be configured to directly manage a plurality of issue queues, so that there could be separately managed individual issue queues for each client.

In one embodiment, the current average latency used for the window estimation formula described above is calculated as a combination of latencies seen by the individual clients rather than the latency of the host. In this case, the a current latency for each client will be include the sum of the times that the most recently completed IO for that client spent in buffer 320 and in issue queue 117. Thus, when IO 312 is completed, if it belonged to client 2, the current latency for client 2 would be the amount of time that IO resided in issue queue 117 and in buffer 320B. A current average latency value for each client can then be calculated as a time-based average of current latencies, and the window estimation formula can use a combined latency, wherein all the client current average latencies are averaged together to form the combined latency value for the host. As described above with reference to FIGS. 5A and 5B, the individual client current average latency values may be combined with values from other hosts to form a combined latency value that takes into account the latencies seen by all or some of the clients accessing the shared resource. Therefore, depending on implementation, the host may calculate a window size based on just the host's current average latency, a combined average latency for clients executing on the host, or a combined average latency for all or some of the clients accessing the common resource.

Figure 8A:
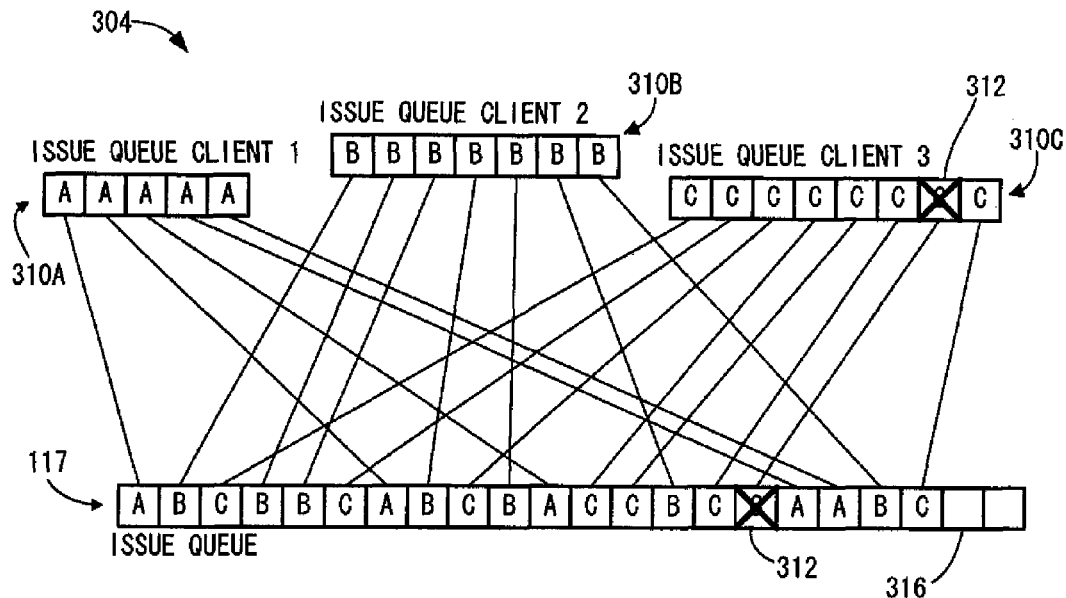
FIG. 8A shows a diagram illustrating another technique for managing an issue queue wherein each client has a corresponding client issue queue.

FIG. 8A shows a diagram 304 illustrating yet another embodiment wherein each client has a corresponding client issue queue 310A, 310B, and 310C. Each client issue queue has a window size that may be calculated independently of the other issue queues using a window estimation formula, such the algorithm described above with reference to Equation 2. In one embodiment, the current average latency may be calculated once for all client issue queues. In another embodiment, a corresponding current average latency value is calculated for each client. Each client's current average latency will be the current average latency for IOs issued by only that client. When calculating the window size for a particular client, the client's own current average latency value may be used, or a combined latency value may be used for the window estimation formula. The combined latency value may be a combination of latency values for the clients on the one host, or for all or some clients on multiple hosts that are accessing the common resource. The combined value may be weighted based on IO size, number of IOs, assigned shares, etc.

Each IO request in each client issue queue 310A, 310B, 310C, corresponds to an IO request pending in hardware issue queue 340. Hardware issue queue 340 therefore has a maximum number of IOs (i.e., its "size") that is equal to the sum of the sizes of client issue queues 310A, 310B, 310C, etc. However, the number of IO requests pending in hardware queue 340 may be managed entirely in the software domain, with the physical hardware queue of the host bus adapter being left at a maximum possible size, but generally not allowed to be filled unless the sum of client issue queue sizes meets or exceeds the size of the host issue queue. When an IO request 312 is filled, the slot opens up in hardware issue queue 340 and corresponding client issue queue 310C. Therefore, when an IO request that originates at client 3 is satisfied, client C will ordinarily replace that IO request with a new IO request. It is also possible, however, that a different client can jump in to claim that slot in hardware issue queue 340 forcing client 3 to take a new slot 316 in hardware issue queue 117. It is also possible that client issue queue 310C is reduced in size in accordance with a new calculation of Equation 2 as described above, in which case any new IO requests from client 3 will have to wait until another slot opens up in client issue queue 310C.

Figure 8B:
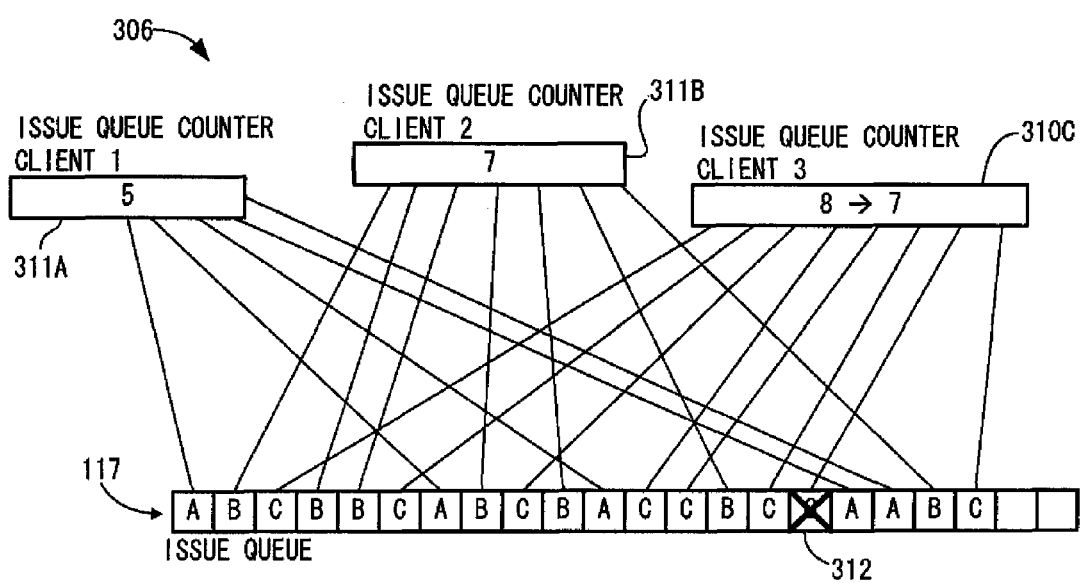
FIG. 8B shows a diagram illustrating another technique for managing an issue queue wherein each client's issue queue is managed using a single hardware issue queue and counters for each client.

Although each client issue queue 310A, 310B, 310C can be represented independently of and in parallel with hardware issue queue 340, in one embodiment, the client issue queues are managed using a single hardware issue queue 117 and counters for each client as shown in diagram 306 of FIG. 8B. Here, each client 1-3 has a corresponding issue queue counter 311A, 311B, 311C. When an IO request 312 is satisfied, the counter for the client corresponding to that request is decremented, e.g., from 8 to 7 as shown, causing disk IO handler 114 (FIG. 2) to pull a new IO request from client 3 so that the number of pending IOs from that client will be incremented and once again match the determined window size based on the window estimation formula (Equation 2) described above.

Figure 8C:
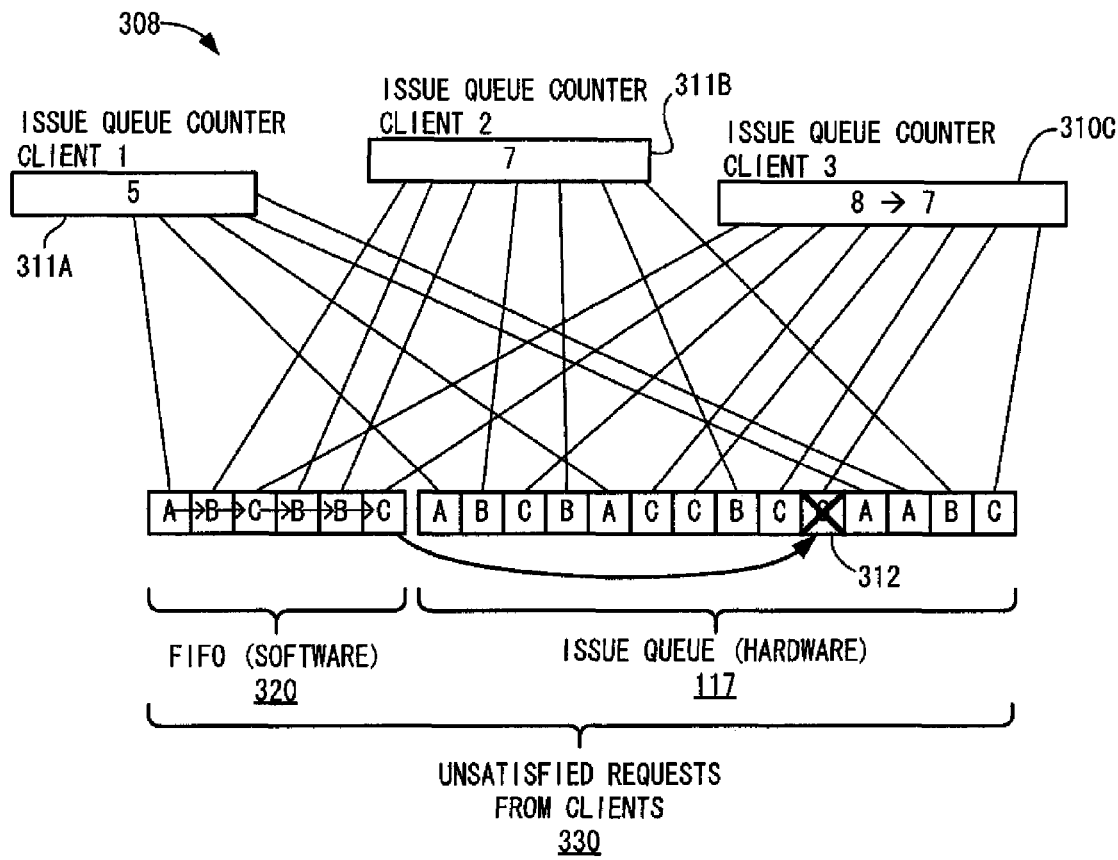
FIG. 8C shows a diagram illustrating yet another technique for managing an issue queue wherein an overflow buffer is implemented in software.

As described above with reference to FIG. 6, a large number of clients 112 residing on host 110, can cause the sum of window sizes for clients 112 to exceed the capacity of hardware issue queue 117. The embodiment described above with reference 8B can also be augmented using a buffer 320. Thus, in the embodiment shown by diagram 308 in FIG. 8C, an overflow buffer 320 implemented in software may be provided. Because it is implemented in software, buffer 320 may be expanded or contracted as necessary to accommodate all the issue queues for each client on a host 110. When an IO request 312 is satisfied, it is removed from issue queue 117, and the next (longest residing) IO request in buffer 320 is sent to HBA, causing it to be sent to storage array 130 (FIGS. 1 and 2) and information about IO request is moved to the slot in issue queue 117 previously occupied by IO request 312. Concurrently, issue queue counter 310C is decremented as indicated in FIG. 8C by the legend "8→7". If client 3 112 has another IO request waiting to be added to the issue queue, then it can be sent to disk IO handler 114 (FIG. 2) and added as the newest resident of buffer 320. It should be noted that when calculating the current average latency for clients in this embodiment, the latency seen may include IO residency times in buffer 320 plus issue queue 117.

Even with the above methodologies, the limitations imposed by a hardware issue queue having a maximum size still adds some measure of "unfairness" to system 100 (FIG. 1) since clients on hosts relying on a software buffer to feed the issue queue are underrepresented at storage array 130. For example, for a client running on a host 110 having an HBA with a maximum issue queue size of 128, but with 256 unsatisfied IO requests 330, the client will see about a two-fold increase in latency. In cases where the unfairness engendered by this scenario is unacceptable, it can be mitigated by adding one or more additional HBAs (only one shown in FIG. 2). Another way to mitigate the above issue is by scaling down all client issue queue sizes so that they remain proportional. Depending on the particular implementation, either strategy may be appropriate. Adding additional HBAs requires investing in additional hardware whereas scaling down client issue queue sizes can impact overall efficiency, making the algorithm non-work-conserving by leaving the array idle while some clients have backlogged requests.

In one embodiment, fractional queue sizes are permitted to provide a finer granularity QoS. The window estimation formula (Equation 2) described above can result in a non-integer value. In certain embodiments, the calculated window size w(t+1) may be truncated or rounded to the nearest integer. However, this can limit the granularity of the QoS provided.

Figure 9:
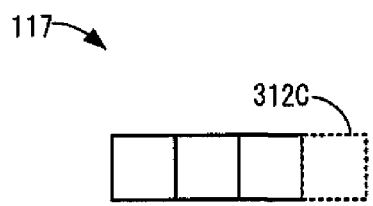
FIG. 9 shows an exemplary issue queue having a fractional window size.

FIG. 9 shows an exemplary issue queue 117 having a fractional window size. In this example, issue queue 117 may be a host issue queue or a client issue queue, depending on the implementation. The value of the window size is divided into an integer amount plus a fractional amount, which is less than one. In certain embodiments, the issue queue is sometimes sized at the truncated integer value, and sometimes at the next integer value, i.e., rounded up to the next whole number. For example, for a calculated window size of 3.4, the issue queue would sometimes be sized at three and sometimes be sized at four, as indicated by dashed box 312C in FIG. 9, indicating that sometimes the issue queue size is 3, and sometimes 4.

In one embodiment, the issue queue size is randomly determined to be the truncated integer value or the next whole number. In this embodiment, the issue queue is maintained at least the integer value. Each time an IO request is received, a random number is generated between zero and one. Every time the random number is less than the fractional amount, e.g., 0.4, then the issue queue size is increased by one. Therefore, for a calculated window size of 3.4, over time, the issue queue will have four slots 40% of the time, and three slots 60%, for an average issue queue size of 3.4.

In another embodiment, the issue queue size is calculated deterministically to average the intended fractional calculated window size. Persons of ordinary skill can easily devise algorithms for deterministically alternating between the truncated integer value and that plus one so that the average window size will equal the calculated window size. For example, the truncated or rounded value can be used initially, then the average window size can be compared with the calculated window size. If average is less than the calculated window size, then the window size is set to the rounded-up value, otherwise it is set to the truncated value. This will result in a convergence over time to the calculated window average. In this embodiment, the average window size may be a moving average calculated using an algorithm similar to Equation 1 above, but for window size instead of latency. When a new calculated window size is obtained from the window estimation formula, e.g., Equation 2, the average window size may be subsequently compared to the new calculated window size, either retaining the previous history or starting again from the truncated value, depending on the implementation. For example, the previous history may be retained if the new calculated window size is less than 1.0 (or another threshold value) from the previously calculated window size.

As described above, $\beta_i$ may be calculated for each host i as a fixed value that is a proportional to the shares assigned to that host, the proportion being selected for all hosts so that the $\beta$ value for each host lies between selected minimum and maximum values, e.g., between zero and four. However, in certain embodiments, the value for $\beta$ for host 110 may be dynamically adjusted depending on the participation of its various clients.

For example, suppose, in FIG. 7, client 3 was idle. As used herein, the term "idle" indicates that, for whatever reason, the client or host is not generating IO requests. When client 3 is idle, clients 1 and 2 have the advantage over other clients on other hosts because they can pick up client 3's unused capacity. That is, the $\beta$ value selected for host 110 is based in part on the requirements of each of the clients attached to that host. If one of the clients is not participating, then the remaining clients on that host have an unfair advantage. (This problem is avoided when a separate window size is computed for each client as described above with reference to FIGS. 8A-8C.) To account for this, $\beta$ for each host may be adjusted as a function of utilization of the clients on that host. In one embodiment, for example, $\beta$ is initially set to be proportional to an overall sum of the shares assigned to clients on the host. The shares of each client are then modified based on its current utilization and the $\beta$ value for the host is dynamically adjusted based on newly computed client shares instead of the originally assigned shares. For example, a client with 2000 shares and 50% utilization will contribute only 10000 shares towards the computation of $\beta$ at the host. To ensure stability of the overall system, in one embodiment, $\beta$ is smoothly adjusted using a time-based linear or non-linear function (e.g., logarithmic or exponential decay), as shown by way of example in Equation 3.

$$\beta_{t+1} = f(\beta_t) \tag{Eq. 3}$$

In another embodiment, which can be combined with the previous embodiment, the value of $\beta$ may be adjusted to support bursts of data. In this case, an administrator setting or other policy setting may dynamically adjust $\beta$ in order to allow a particular host or client that has been idle for some time to take a larger share of resources for a period of time such that their average use of resources is close to a target corresponding to the assigned shares for that host.

Figure 10:
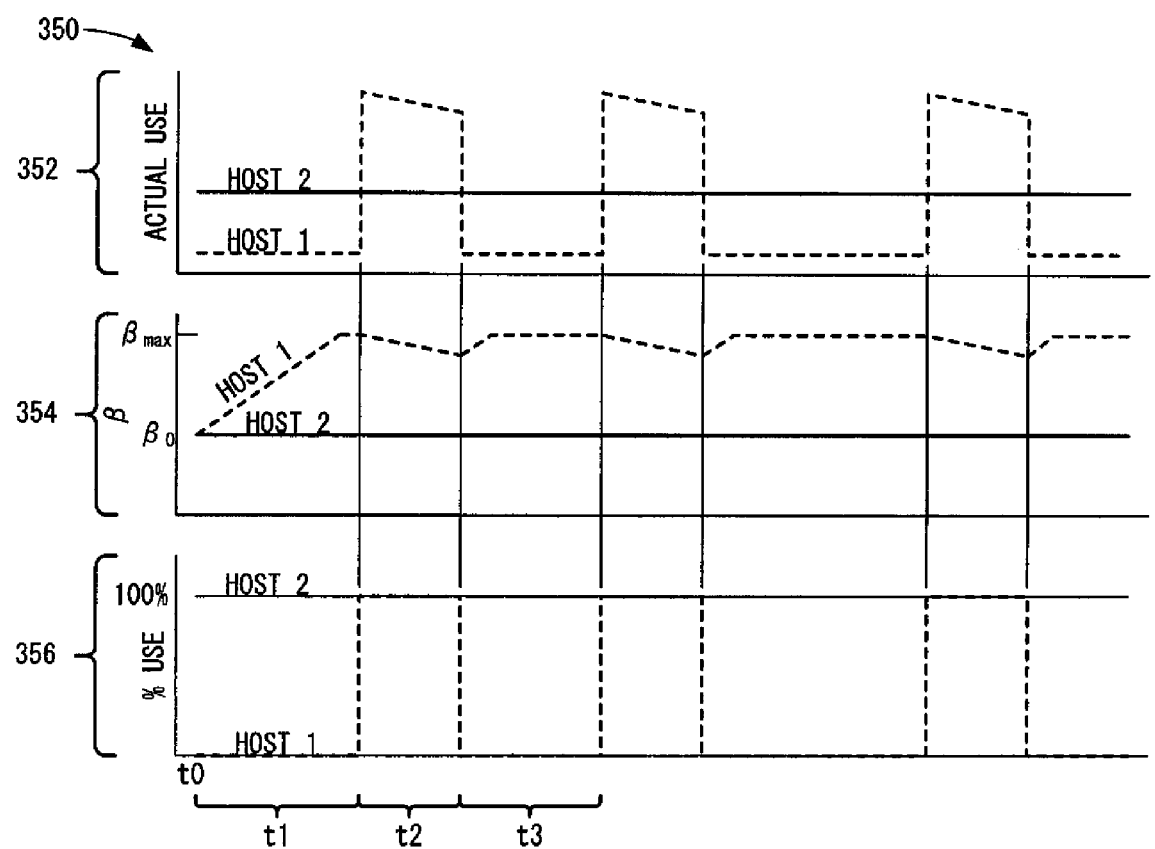
FIG. 10 shows a graph illustrating by way of example a possible implementation of burst mode support.

FIG. 10 shows a graph 350 illustrating by way of example a possible implementation of burst mode support. This example shows two hosts, HOST 1, and HOST 2, wherein HOST 1 is idle a majority of the time, but occasionally has bursts of IO requests whereas HOST 2 continually issues IO requests. Both HOST 1 and HOST 2 have the same amount of assigned shares, so that at time t0, the initial $\beta$ value, $\beta_0$ for each host is the same as shown in graph 354. During time period t1, HOST 1 is idle whereas HOST 2 is using 100% of its calculated window size as shown in chart 356. Since HOST 1 is idle, the algorithm gradually increases $\beta$ to a maximum value $\beta max$ as shown in chart 354. At time t2, HOST 1 starts sending IO requests and fills its issue queue, which is larger than normal as a result of $\beta$ being increased. While HOST 1 is using 100% of its issue queue, $\beta$ is gradually reduced back towards $\beta_0$, the initial $\beta$ size. However, when HOST 1 goes idle again at time t3, $\beta$ is increased back towards $\beta max$. As shown in graph 352, the actual use of the array by HOST 1 should average over time to approximately, the same use enjoyed by HOST 2. Although described herein for illustrative purposes as directly modifying the value for $\beta$, it is also contemplated that an addend or coefficient may be applied to $\beta$ such that the value $\beta$ itself stays fixed, but is modified using the addend or coefficient as described above. In addition, any adjustments may be made using a linear or non-linear function, e.g., as described with reference to Equation 3 above.

In one embodiment, the administrator may select a policy to reward hosts that are idle for a period of time by a setting a burst parameter. For example, if the burst parameter is set to zero, then a host is not rewarded at all for being idle. In this case, $\beta$ is not increased even when the host is idle. (However, $\beta$ may be reduced as described above with reference to FIG. 7 when fewer than all the clients on the host are idle.) When the burst parameter is set to a maximum value, e.g., 10 or 100, then $\beta$ is increased during idle periods and reduced during burst periods such that on average, over time, each host utilizes the storage array the same amount as would be the case if the use was continuous rather than in bursts, i.e., so that HOST 1 and HOST 2 essentially issue the same number of IO requests over a period of time. In practice, the burst parameter may be set to a value between zero and the maximum value in accordance with requirements of the applications (clients) being implemented on the hosts.

In accordance with the above description, the system described herein serves to maintain overall latency close to a selected threshold while at the same time provide service in proportion to user set shares. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A method for providing quality of service to a plurality of clients accessing a common resource, the common resource being a middle-tier or back-end server, the method comprising:

receiving a plurality of IO requests from clients executing as software entities on one host;

determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;

separately managing an IO request queue for each client, and populating the issue queue based on contents of the IO request queues;

when the host issue queue is not full, entering a new IO request into the host issue queue and issuing the new IO request to the common resource;

calculating a current average latency, the current average latency being an average of individual latencies observed in completing the IO requests;

calculating an adjusted window size, the adjusted window size being based at least in part on the current average latency, the calculating of the adjusted window size including factoring in an assigned share representing a relative level of priority of the one host as compared to other hosts accessing the common resource, the assigned share being represented by a value $\beta$;

adjusting the value $\beta$ based on a participation of each of the clients on the one host; and setting the specified limit to correspond with the adjusted window size.

2. The method of claim 1, wherein the value $\beta$ is a host $\beta$ and each client is assigned an share of resources represented by a client $\beta$ that influences a window size for the client, the host $\beta$ being dependent on the sum of the client $\beta$s; each client $\beta$ being reduced when a corresponding one of the clients does not fully utilize its allocated window size.

3. The method of claim 1, wherein when the calculated adjusted window size is a non-integer value, the specified limit is set to one of a truncated integer value or a next whole number value of the calculated adjusted window size such that over time, the specified limit approaches the calculated adjusted window size.

4. The method of claim 1, further comprising:
increasing the window size when the host is idle, to accommodate bursts of data during non-idle periods, the host being determined to be idle when it does not generate any IO requests for a selected period of time.

5. The method of claim 1, wherein each of the IO request queues is a buffer, the method further comprising:
copying an IO request from one of the buffers to the host issue queue when the host issue queue is not full and one or more of the buffers is not empty.

6. The method of claim 5, wherein the host issue queue is populated from the buffers according to a priority of corresponding clients, such that IO requests are populated from buffers of clients with a greater priority more often than from buffers of clients with a lesser priority.

7. The method of claim 5, wherein each of the buffers operates as a first-in, first-out (FIFO) buffer.

8. The method of claim 1, wherein the value $\beta$ is initially set to be proportional to an overall sum of shares assigned to the clients, and the adjusting of the value $\beta$ is made by recalculating $\beta$ based on a contribution of shares to the host, the contribution for each client being determined by multiplying the number of shares assigned to the client by a fraction of utilization by the client.

9. The method of claim 8, wherein the fraction of utilization is a moving average of utilization.

10. The method of claim 8, wherein the value $\beta$ is smoothly adjusted using a time-based function.

11. The method of claim 1, wherein:
each of the IO request queues comprises a client issue queue tracking a plurality of IO requests received from a corresponding one of the clients, each client issue queue having a identifying a maximum number of IO requests, the maximum number being a client window size; and
the calculating of the adjusted window size further comprises calculating an adjusted client window size for each of the clients.

12. The method of claim 11, wherein the calculating of each of the adjusted client window sizes includes factoring in a corresponding assigned share representing a relative level of priority for each of the clients.

13. The method of claim 11, wherein the adjusted client window size is computed according to the following formula:

$$w(t+1) = (1-\gamma)w(t) + \gamma\left(\frac{LAT_{threshold}}{CAL(t)}w(t) + \beta\right),$$

where $w(t+1)$ is the adjusted window size at time $t+1$, $\gamma$ is a constant value selected between zero and one and determines the influence that a current client window size has on the new window size, $LAT_{threshold}$ is a system-wide latency threshold selected to balance throughput with latency, and $\beta$ is a per-client value based on an assigned share representing a relative level of priority of the client as compared to other clients accessing the common resource.

14. The method of claim 11, wherein the tracking of the plurality of IO requests comprises maintaining a count of a number of the IO requests from the corresponding one of the clients that is pending at the host issue queue.

15. The method of claim 11, wherein when the calculated adjusted client window size is a non-integer value, the client window size is set to one of a truncated integer value or a next whole number value of the calculated adjusted client window size such that over time, the client window size approaches the calculated adjusted client window size.

16. A method for providing quality of service to a plurality of clients accessing a common resource, the common resource being a middle-tier or back-end server, the method comprising:

receiving a plurality of IO requests from clients executing as software entities on one host;

determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;

separately managing an IO request queue for each client, and populating the issue queue based on contents of the IO request queues, wherein each of the IO request queues comprises a client issue queue tracking a plurality of IO requests received from a corresponding one of the clients, each client issue queue having a identifying a maximum number of IO requests, the maximum number being a client window size;

when the host issue queue is not full, entering a new IO request into the host issue queue and issuing the new IO request to the common resource;

calculating a current average latency, the current average latency being an average of individual latencies observed in completing the IO requests; and calculating an adjusted window size, the adjusted window size being based at least in part on the current average latency, wherein the calculating of the adjusted window size further comprises calculating an adjusted client window size for each of the clients;

setting the specified limit to correspond with the adjusted window size;

identifying a physical limitation on the window size of the host issue queue; and when the adjusted window size is greater than the physical limitation of the host issue queue, storing newly issued ones of the IOs issued by the clients in a host software queue when the host issue queue is full, the issuing of the IO request to the common resource when the host issue queue is not full further comprising copying an IO request from the host software queue to the host issue queue.

17. The method of claim 16, wherein the host issue queue comprises a hardware queue maintained by a host bus adapter and the physical limitation is a memory limit of the hardware queue.

18. A method for providing quality of service to a plurality of clients accessing a common resource, the common resource being a middle-tier or back-end server, the method comprising:

receiving a plurality of IO requests from clients executing as software entities on one host;

determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;

separately managing an IO request queue for each client, and populating the issue queue based on contents of the IO request queues;

when the host issue queue is not full, entering a new IO request into the host issue queue and issuing the new IO request to the common resource;

calculating a current average latency, the current average latency being an average of individual latencies observed in completing the IO requests; and calculating an adjusted window size, the adjusted window size being based at least in part on the current average latency;

setting the specified limit to correspond with the adjusted window size;

increasing the window size when the host is idle, to accommodate bursts of data during non-idle periods, the host being determined to be idle when it does not generate any IO requests for a selected period of time;

the calculating of the adjusted window size includes factoring in an assigned share representing a relative level of priority of the one host as compared to other hosts accessing the common resource, the assigned share being represented by a value $\beta$; and the increasing of the window size comprises adjusting the value of $\beta$ to increase the window size.

19. The method of claim 18, wherein the increasing of the window size is performed in accordance with a user-selectable burst parameter, the burst parameter limiting an amount of adjustment to the window size.

20. A method for providing quality of service to a plurality of clients accessing a common resource, the common resource being a middle-tier or back-end server, the method comprising:

receiving a plurality of IO requests from clients executing as software entities on one host of a plurality of hosts;

determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;

issuing the IO request to the common resource when the host issue queue is not full;

calculating a combined average latency, the combined average latency being an average of current average latencies for completing the IO requests experienced at each of at least a subset of the hosts;

calculating an adjusted window size, the adjusted window size being based at least in part on the combined average latency;

setting the specified limit to correspond with the adjusted window size; and wherein the common resource is a shared system volume (LUN) of a data storage array and the calculating of the combined average latency comprises:

each host writing latency information to the LUN, the latency information including the current average latency experienced at the host;

each host reading latency information written to the LUN by other ones of the hosts;

each host calculating the combined average latency from local latency information and the latency information read from the LUN by averaging the current average latency values.

21. The method of claim 20, wherein the calculating of the combined average latency comprises calculating a current average latency observed by the one host, and combining the current average latency for the one host with current average latencies observed by other hosts.

22. The method of claim 20, wherein the calculating of the combined average latency comprises calculating client current average latencies observed by the clients, and combining the client current average latencies with the other current average latency values from other hosts.

23. The method of claim 20, wherein each host is assigned a corresponding disk block that is part of a common file shared by the hosts, and writes the latency information to the assigned corresponding disk block.

24. A method for providing quality of service to a plurality of clients accessing a common resource, the common resource being a middle-tier or back-end server, the method comprising:

receiving a plurality of IO requests from clients executing as software entities on one host of a plurality of hosts;

determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;

issuing the IO request to the common resource when the host issue queue is not full;

calculating a combined average latency, the combined average latency being an average of current average latencies for completing the IO requests experienced at each of at least a subset of the hosts;

calculating an adjusted window size, the adjusted window size being based at least in part on the combined average latency; and setting the specified limit to correspond with the adjusted window size; and wherein the calculating of the combined average latency comprises:

transmitting latency information from each of the hosts to a central manager, the central manager being a computer program in communication with the hosts, the latency information including the current average latencies experienced at each of the hosts;

averaging the current average latencies provided to the central manager to obtain the combined average latency; and transmitting the combined average latency to each of the hosts.

25. A non-transitory machine readable storage medium for providing quality of service to a plurality of clients accessing a common resource, the common resource being a middle-tier or back-end server, the machine readable medium causing the hosts to implement a method, the method comprising:

receiving a plurality of IO requests from clients executing as software entities on one host;

determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;

separately managing an IO request queue for each client, and populating the host issue queue based on contents of the IO request queues;

when the host issue queue is not full, entering a new IO request into the host issue queue and issuing the new IO request to the common resource;

calculating a current average latency, the current average latency being an average of individual latencies observed in completing the IO requests; and calculating an adjusted window size, the adjusted window size being based at least in part on the current average latency, the calculating of the adjusted window size includes factoring in an assigned share representing a relative level of priority of the one host as compared to other hosts accessing the common resource, the assigned share being represented by a value $\beta$;

adjusting the value $\beta$ based on a participation of each of the clients on the one host; and setting the specified limit to correspond with the adjusted window size.

26. The non-transitory machine readable storage medium of claim 25, wherein the value $\beta$ is a host $\beta$ and each client is assigned a share of resources represented by a client $\beta$ that influences a window size for the client, the host $\beta$ being dependent on the sum of the client $\beta$s; each client $\beta$ being reduced when a corresponding one of the clients does not fully utilize its allocated window size.

27. The non-transitory machine readable storage medium of claim 25, wherein each of the IO request queues is a buffer and the method further comprises:

copying an IO request from one of the buffers to the host issue queue when the host issue queue is not full and one or more of the buffers is not empty.

28. The non-transitory machine readable storage medium of claim 27, wherein the host issue queue is populated from the buffers according to a priority of corresponding clients, such that IO requests are populated from buffers of clients with a greater priority more often than from buffers of clients with a lesser priority.

29. The non-transitory machine readable storage medium of claim 27, wherein each of the buffers operates as a first-in, first-out (FIFO) buffer.

30. The non-transitory machine readable storage medium of claim 27, wherein when the calculated adjusted window size is a non-integer value, the specified limit is set to one of a truncated integer value or a next whole number value of the calculated adjusted window size such that over time, the specified limit approaches the calculated adjusted window size.

31. The non-transitory machine readable storage medium of claim 25, wherein the value $\beta$ is initially set to be proportional to an overall sum of shares assigned to the clients, and the adjusting of the value $\beta$ is made by recalculating $\beta$ based on a contribution of shares to the host, the contribution for each client being determined by multiplying the number of shares assigned to the client by a fraction of utilization by the client.

32. The non-transitory machine readable storage medium of claim 31, wherein the fraction of utilization is a moving average of utilization.

33. The non-transitory machine readable storage medium of claim 31, wherein the value $\beta$ is smoothly adjusted using a time-based function.

34. The non-transitory machine readable storage medium of claim 25, wherein:

each of the IO request queues comprises a client issue queue tracking a plurality of IO requests received from a corresponding one of the clients, each client issue queue having a identifying a maximum number of IO requests, the maximum number being a client window size; and the calculating of the adjusted window size further comprises calculating an adjusted client window size for each of the clients.

35. The non-transitory machine readable storage medium of claim 34, wherein the calculating of each of the adjusted client window sizes includes factoring in a corresponding assigned share representing a relative level of priority for each of the clients.

36. The non-transitory machine readable storage medium of claim 34, wherein the adjusted client window size is computed according to the following formula:

$$w(t+1) = (1-\gamma)w(t) + \gamma\left(\frac{LAT_{threshold}}{CAL(t)}w(t) + \beta\right),$$

where $w(t+1)$ is the adjusted window size at time $t+1$, $\gamma$ is a constant value selected between zero and one and determines the influence that a current client window size has on the new window size, $LAT_{threshold}$ is a system-wide latency threshold selected to balance throughput with latency, and $\beta$ is a per-client value based on an assigned share representing a relative level of priority of the client as compared to other clients accessing the common resource.

37. The non-transitory machine readable storage medium of claim 34, wherein the tracking of the plurality of IO requests comprises maintaining a count of a number of the IO requests from the corresponding one of the clients that is pending at the host issue queue.

38. The non-transitory machine readable storage medium of claim 34, wherein when the calculated adjusted client window size is a non-integer value, the client window size is set to one of a truncated integer value or a next whole number value of the calculated adjusted client window size such that over time, the client window size approaches the calculated adjusted client window size.

39. A non-transitory machine readable storage medium for providing quality of service to a plurality of clients accessing a common resource, the common resource being a middle-tier or back-end server, the machine readable medium causing the hosts to implement a method, the method comprising:
   receiving a plurality of IO requests from clients executing as software entities on one host;
   determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;
   separately managing an IO request queue for each client, and populating the host issue queue based on contents of the IO request queues;
   when the host issue queue is not full, entering a new IO request into the host issue queue and issuing the new IO request to the common resource;
   calculating a current average latency, the current average latency being an average of individual latencies observed in completing the IO requests; and
   calculating an adjusted window size, the adjusted window size being based at least in part on the current average latency;
   setting the specified limit to correspond with the adjusted window size identifying a physical limitation on the window size of the host issue queue; and
   when the adjusted window size is greater than the physical limitation of the host issue queue, storing newly issued ones of the IOs issued by the clients in a host software queue when the host issue queue is full, the issuing of the IO request to the common resource when the host issue queue is not full further comprising copying an IO request from the host software queue to the host issue queue.

40. The non-transitory machine readable storage medium of claim 39, wherein the host issue queue comprises a hardware queue maintained by a host bus adapter and the physical limitation is a memory limit of the hardware queue.

41. A non-transitory machine readable storage medium for providing quality of service to a plurality of clients accessing a common resource, the common resource being a middle-tier or back-end server, the machine readable medium causing the hosts to implement a method, the method comprising:
   receiving a plurality of IO requests from clients executing as software entities on one host;
   determining whether a host issue queue maintained by the one host is full, the host issue queue maintaining dispatch and completion information about requests from the clients that are pending at the common resource, the host issue queue being considered full when a number of the requests being maintained by the host issue queue reaches a specified limit, the limit being a window size;
   separately managing an IO request queue for each client, and populating the host issue queue based on contents of the IO request queues;
   when the host issue queue is not full, entering a new IO request into the host issue queue and issuing the new IO request to the common resource;
   calculating a current average latency, the current average latency being an average of individual latencies observed in completing the IO requests; and
   calculating an adjusted window size, the adjusted window size being based at least in part on the current average latency; and
   setting the specified limit to correspond with the adjusted window size;
   increasing the window size when the host is idle, to accommodate bursts of data during non-idle periods, the host being determined to be idle when it does not generate any IO requests for a selected period of time; and
   wherein the increasing of the window size is performed in accordance with a user-selectable burst parameter, the burst parameter limiting an amount of adjustment to the window size.

42. The non-transitory machine readable storage medium of claim 41, wherein:
   the calculating of the adjusted window size includes factoring in an assigned share representing a relative level of priority of the one host as compared to other hosts accessing the common resources, the assigned share being represented by a value $\beta$; and
   the increasing of the window size comprises adjusting the value of $\beta$ to increase the window size.

* * * * *